(12) United States Patent
Feather et al.

(10) Patent No.: US 7,190,839 B1
(45) Date of Patent: Mar. 13, 2007

(54) METHODS AND APPARATUS FOR GENERATING MULTI-LEVEL GRAPHICS DATA

(75) Inventors: Heath Feather, Fremont, CA (US); Richard Holmes, San Jose, CA (US)

(73) Assignee: Cadence Design System, Inc., San Jose, CA (US)

( * ) Notice: Subject to any disclaimer, the term of this patent is extended or adjusted under 35 U.S.C. 154(b) by 446 days.

(21) Appl. No.: 10/171,047

(22) Filed: Jun. 12, 2002

Related U.S. Application Data

(60) Provisional application No. 60/298,135, filed on Jun. 12, 2001.

(51) Int. Cl.
*G06K 9/36* (2006.01)
(52) U.S. Cl. ...................... 382/240; 382/299
(58) Field of Classification Search ............... 382/299, 382/302, 276, 261, 263, 264, 144, 145, 147, 382/148, 240
See application file for complete search history.

(56) References Cited

U.S. PATENT DOCUMENTS

| | | | | |
|---|---|---|---|---|
| 5,022,091 | A | * 6/1991 | Carlson | ............ 382/240 |
| 5,519,628 | A |   5/1996 | Russell et al. | |
| 6,005,978 | A | * 12/1999 | Garakani | ............ 382/218 |
| 6,075,538 | A |   6/2000 | Shu et al. | |
| 6,184,891 | B1 |   2/2001 | Blinn | |
| 6,326,964 | B1 |   12/2001 | Snyder et al. | |
| 6,463,426 | B1 | * 10/2002 | Lipson et al. | ............ 707/3 |
| 6,493,858 | B2 |   12/2002 | Solomon | |
| 6,532,581 | B1 |   3/2003 | Toyonaga et al. | |
| 6,801,215 | B1 |   10/2004 | Silva et al. | |
| 6,886,148 | B2 |   4/2005 | Solomon | |
| 6,917,711 | B1 |   7/2005 | Wang et al. | |
| 2001/0034588 | A1 |   10/2001 | Agrawals et al. | |
| 2002/0170025 | A1 | * 11/2002 | Shih | ............ 716/7 |

(Continued)

OTHER PUBLICATIONS

Samet, Hanan, Hierarchical Representations of Collections of Small Rectangles, Dec. 1988, ACM Press, vol. 20, Issue 4,pp. 271-309.*

(Continued)

*Primary Examiner*—Matthew C. Bella
*Assistant Examiner*—Dennis Rosario
(74) *Attorney, Agent, or Firm*—Stattler, Johansen & Adeli LLP

(57) ABSTRACT

A technique generates a pyramid of image tiles to represent a source image at different resolutions. A base image tile stores, in a plurality of elements, an "on" state or an "off" state to represent the source image at a first resolution. Additional image tiles, with image resolutions lower than the resolution of the base image tile, are generated. The base image tile is divided into groupings of elements, such that each level of the pyramid of image tiles is generated by mapping a grouping of elements from the base image tile to an image tile at different levels of the pyramid. A threshold density of elements in the grouping elements is selected. If the grouping of elements in the base image tile for a level has a threshold density of "on" elements, the image data for the element in the current level is set to an "on" state. Conversely, the image data for the element is set to an "off" state if the threshold density of "on" elements in the base image tile grouping is less than the threshold density.

13 Claims, 10 Drawing Sheets

U.S. PATENT DOCUMENTS

2003/0076722 A1  4/2003  Solomon
2004/0080525 A1  4/2004  Miller et al.

OTHER PUBLICATIONS

Nandy et al., Dual Quadtree Representation for VLSI Designs, 1986, IEEE Press, pp. 663-666.*

Samet, Hanan, The Quadtree and Related Hierarchical Data Structures, Jun. 1984, ACM Press, vol. 16, Issue 2, pp. 187-260.*

U.S. Appl. No. 10/170,946, filed Jun. 12, 2002, Feather et al.

U.S. Appl. No. 10/170,946, filed Jun. 6, 2002, Heath Feather, et. al., Non-Final Office Action of related pending U.S. Patent Appl.

* cited by examiner

Array of 2 x 2 Tiles

Array of 4 x 4 Tiles

METHODS AND APPARATUS FOR GENERATING MULTI-LEVEL GRAPHICS DATA

CROSS-REFERENCES TO RELATED APPLICATIONS

This application claims the benefit of U.S. Provisional Patent Application No. 60/298,135, filed Jun. 12, 2001, entitled "Methods And Apparatus For Representing And Manipulating Polygons In A Multidimensional Space."

BACKGROUND OF THE INVENTION

1. Field of the Invention

The present invention is directed toward the field of graphics, and more particularly toward generating graphics data at multiple resolutions.

2. Art Background

It is typical for graphics applications to manipulate large source images for display on a computer. For example, a source image may consist of many mega-pixels of image data. The graphics application typically operates within a broader application. For example, software, which allows a user to view and manipulate multi-level integrated circuit ("IC") designs, utilizes a graphics application. The underlying source image for the IC design application is large, and thus the source image can't be displayed entirely on a computer display at full resolution.

In imaging applications, it is important to display images at various resolutions. For example, images are displayed at high resolutions so that image details may be visible. In addition, graphics applications require display of images at low resolutions. Since large source images can't be viewed at full resolution on a typical computer display, displaying the image at low resolutions permits viewing of large portions of the image. Typically, the IC design software permits the user, through use of a user interface, to pan large IC designs to permit viewing desired portions of the design. In addition, the IC design software permits the user to view the IC designs or portions of the IC designs at different resolutions. Accordingly, it is a desirable feature of graphics applications to provide the ability to allow a user to interact with the image data by selecting portions of the source image to view at various resolutions.

Many techniques have been developed to display data at different resolutions. Typically, data is displayed at high resolutions by scaling the image data for mapping to pixel data. Techniques have been developed to display large quantities of data at low resolutions. One technique for displaying large source images at low resolutions generates texture maps. Texture maps permit a graphics system to render low resolution images of a large source image. As disclosed herein, the techniques of the present invention permit accurate rendering of images, including low resolution images of large source images.

SUMMARY OF THE INVENTION

A technique generates multi-level image data to represent a source image at different resolutions. In one embodiment, a pyramid of image tiles is generated to represent image data at different resolutions. A first or base image tile stores, in a plurality of elements, an "on" state or an "off" state to represent the source image at a first resolution. Additional image tiles, within the pyramid of image tiles, are generated from the base image tile. The additional image tiles comprise image resolutions lower than the resolution of the base image tile.

In one embodiment, to generate the pyramid of image tiles, the base image tile is divided into groupings of elements. Each level of the pyramid of image tiles is generated by mapping a grouping of elements from the base image tile to an image tile at different levels of the pyramid. For example, if the resolution between levels of the pyramid decrease by a factor of ¼ per level, then the grouping of elements from the base image tile to the second level image tile comprises a four (4) to one mapping. A threshold density of elements in the grouping elements is selected. The threshold density defines a subset of elements in the base image tile. In one embodiment, the threshold density of elements comprises 25 percent of the elements in the grouping. The technique determines whether the grouping of elements in the base image tile for a level has a threshold density of "on" elements. If so, the image data for the element in the current level is set to an "on" state. Conversely, the image data for the element is set to an "off" state if the threshold density of "on" elements in the base image tile grouping is less than the threshold density.

In one embodiment, the source image comprises multiple layers of image data. For this embodiment, each image tile in the pyramid includes a bit plane to represent each layer of the source image. For example, the source image may comprise an integrated circuit design. The integrated circuit design may include multiple layers of image data.

DETAILED DESCRIPTION

Figure 1A:
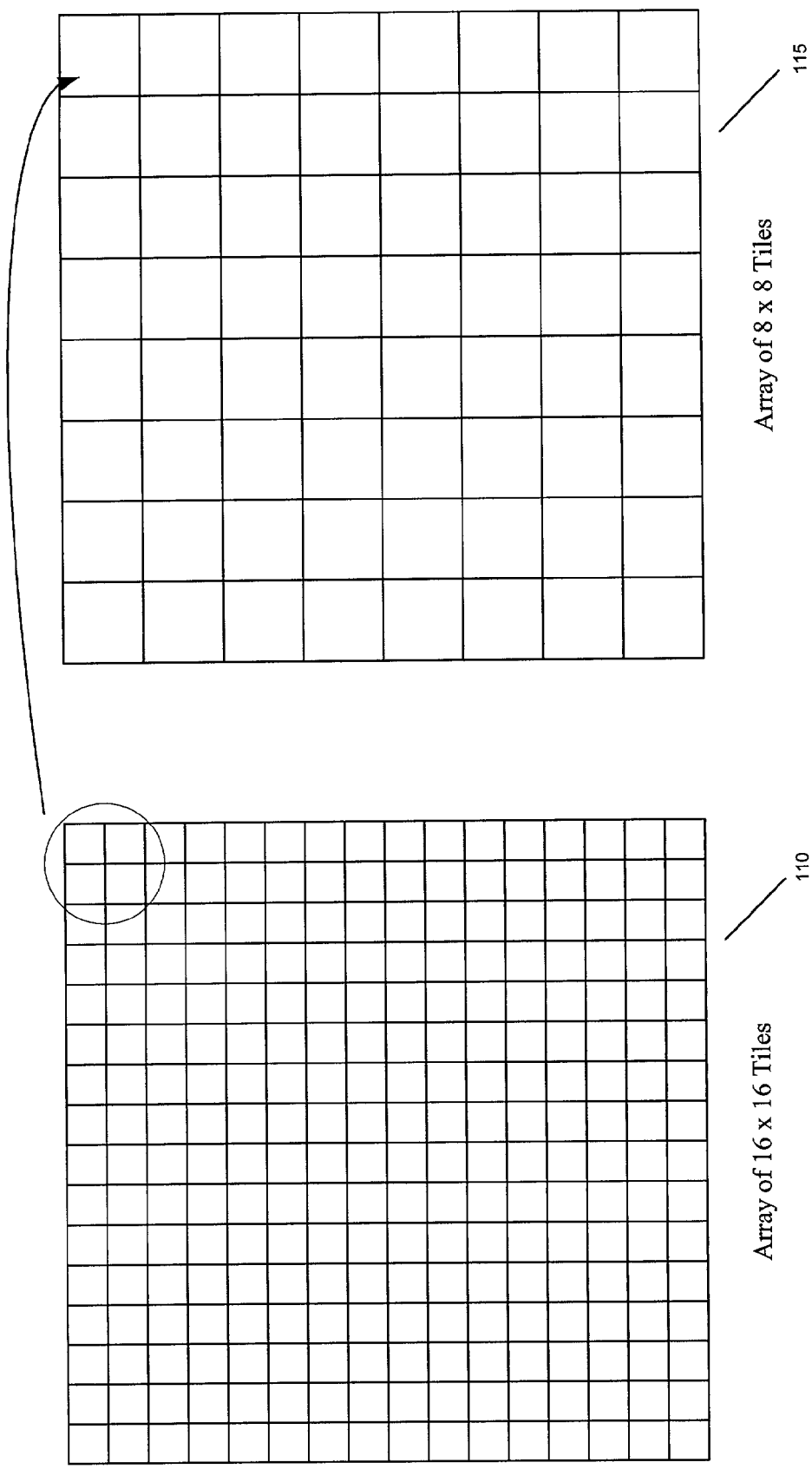
FIG. 1a illustrates one embodiment for the first two levels of texture maps.

The disclosure of U.S. Provisional Patent Application No. 60/298,135, filed Jun. 12, 2001, entitled "Methods And Apparatus For Representing And Manipulating Polygons In A Multidimensional Space" is hereby expressly incorporated herein by reference.

The present invention renders graphical images on a computer output display. In one embodiment for graphics rendering software, two different techniques are applied depending upon the display resolution of the source image. As used herein, the source image connotes the entire data set for display by the graphics software. For electronic design automation (EDA) applications, the source image consists of an integrated circuit design that includes geometric objects that represents interconnect wires. For this embodiment, if the display resolution of a target image (all or a portion of the source image for display) is greater than a predetermined threshold resolution, then the graphics software uses the data structures to render geometric objects on a display ("data structure technique"). Alternatively, if the resolution of a target image is less than a predetermined threshold resolution, then texture maps are used to render the target image ("texture map technique").

One embodiment for rendering images on a computer display is as follows. The graphics application receives a target image (e.g., display coordinates and resolution) from the underlying application. For example, if the underlying application is an EDA application, then the graphics software receives resolution and display coordinates for an IC design. The graphics application determines whether the resolution of the target image is greater than, less than or equal to the predetermined threshold image. The predetermined threshold resolution may be selected such that target images with a resolution equal to the predetermined resolution threshold are processed using the texture map technique or processed using the data structure technique. If the resolution of the target image is less than (or equal to) the predetermined threshold resolution, then the graphics software selects the texture map technique. Using the texture map technique, the graphics software converts the image tile data to RGB color data in the form of a texture map, and passes the RGB color data to the graphics sub-system (e.g., computer graphics card) for rendering on the computer output display. If the resolution of the target image is greater than (or equal to) the predetermined threshold resolution, then the graphics software selects the data structure technique. Using the data structure technique, the graphics software obtains the coordinates of the geometric objects within the target image coordinates using the tree data structure, and scales the resolution of the geometric object coordinates to the target image resolution. The graphics software generates RGB color data for the image, and passes the RGB color data to the graphics sub-system (e.g., computer graphics card) for rendering on the computer output display.

Data Structure Technique:

The data structures that represent diagonal lines have applications for use in rendering geometric objects on a computer display (i.e., graphics applications). U.S. patent application Ser. No. 10/066,387, entitled "Methods and Apparatus for Storing And Manipulating Diagonal Interconnect Lines Of A Multidimensional Integrated Circuit Design", filed Jan. 31, 2002, describes data structures for storing interconnect lines on an integrated circuit design, and is expressly incorporated herein by reference. One application for graphics includes rendering integrated circuit designs on a computer display for use in conjunction with EDA software.

The data structure technique is used for rendering target images with a resolution greater than the pre-determined threshold resolution. For this embodiment, the graphics software generates, prior to run time, an ng-tree, a kd-tree or a quad tree to represent all of the geometric objects in the source image. For the EDA application, the ng-tree, kd-tree or a quad tree data structure stores geometric representations for all the interconnect lines. In one embodiment, the geometric representations are polygons to support integrated circuit designs that employ diagonal wiring geometries. To render sub-images of the source image using the data structure technique, the graphics software locates all geometric objects in the target image. Specifically, the graphics software conducts range queries on the ng-tree, a kd-tree or a quad tree data structure for all geometric images that are included in the coordinates defined by the target image. The ng-tree, a kd-tree or a quad tree data structure stores data at the full resolution of the geometric object. To render the target image on a computer display, the graphics application software scales the geometric objects, obtained from the range query on the tree data structure, to fit the resolution of the target image.

Texture Maps:

The texture map technique generates image tile data for storage in memory and for subsequent use during run time. One embodiment for generating image tile data is described more fully below. A first image tile consists of a rendering of the source image at a first resolution. For example, the graphics application may select the lowest resolution for rendering the source image as the first resolution. For example, if the lowest resolution for displaying the source image is 1 mega-pixels, then the first image tile stores data to represent the entire source image at one mega-pixel. Additional image tiles, one for each level, are generated for "n" additional levels. Each image tile level represents a different display resolution. In one embodiment, an image tile for a corresponding level is partitioned into four sub-images based on the resolution of the prior image tile level. Thus, for this embodiment, the next image tile level comprises a resolution four times greater than the prior image tile level.

In one example, the first image tile has a resolution of 1 mega-pixel, and thus the second image tile is a division of the source image into four sub-images, wherein each sub-image consists of 1 mega-pixel image. In essence, the four sub-images in the second image tile level partition the source image into a "2×2" array. For this embodiment, a third texture map divides the source image into 16 sub-images (4×4). Thus, for the example image tile data, the source image is partitioned into 16 sub-images, each sub-image having a resolution of 1 mega-pixel. The process of generating additional levels of image tile data is repeated until the resolution of the source image equals the predetermined threshold image. For example, if the predetermined threshold image for the source image is 256 mega-pixels (16×16) sub images and the resolution for the first texture map is 1 mega-pixel, then the graphics application generates four levels of image tile data: a first texture map level that represents a 1 mega-pixel image of the source image; a second image tile data level that represents a 4 mega-pixel image partitioned into 4—1 mega-pixel sub-images, a third level that represents a 16 mega-pixel image; a fourth level that represents a 64 mega-pixel image; and a fifth image tile level that represents a 256 mega-pixel image partitioned into 256—1 mega-pixel sub-images.

The graphics application may generate the image tile data using any well-known technique. One embodiment for generating the image tile data is as follows. The graphics application divides the source image into a two dimensional array of tiles in the manner described above. For example, if the source image is divided into 16 tiles (4×4 array) for a first image tile layer (i.e., image tile layer with the highest resolution), then a second image tile layer consists of 4 tiles (2×2) and a third image tile layer (i.e., image tile layer with the lowest resolution) consists of one tile. The size of the tiles (i.e., numbers of pixels per tile) is selected as a power of two (e.g., 16×16, 32×16 32×32, 64×64, 128×64, 512×256, 1024×1024, etc). The pixels within a tile are referred to herein as elements. The graphics application generates a spatially organized tree, such as a kd tree, for the geometric objects contained in the source image.

A description for one embodiment to generate image tile data for texture maps follows. In one embodiment, the image tile data comprises 32 bits per pixel. However, the image tile data may comprise any number of bits of data depending upon the application. In addition, each tile may include a plurality of layers. The image tile represents underlying "content" for the corresponding pixel. In one embodiment for an EDA application, the image tile represents interconnect lines, for the corresponding area, situated on one or more layers of an integrated circuit design. For example, the image tile data may define, for a corresponding pixel, a wire situated on a metal 4 layer, a wire situated on layer 2 and a wire situated on layer 1. The image tile data defines the importance of a wire for rendering the texture map on an output display. For the above example, the image tile data may define the interconnect wire on layer 4 as the prominent wire to display, the interconnect wire on layer 2 as the second most important wire to display, and the interconnect wire on layer 1 as the third most importance wire to display.

The graphics application populates the pixel data for each image tile layer, and determines the importance level for display. Thus, for each pixel represented in an image tile, the pixel data represents all layers that have content as well as the order of importance for displaying the content. This process is repeated for each image tile. Note that the layer of importance for display of an interconnect wire may change as the resolution level for the image tile decreases. For example, at the lowest resolution (e.g., one tile), several pixels are mapped from the highest resolution image tile. The content for the region (e.g., various interconnect lines) may change due to the mapping of several pixels from a higher resolution to a single pixel in a lower resolution.

The present invention generates image tiles, and subsequently texture maps from source data, such as the data that represents an integrated circuit design. In one embodiment, to generate texture maps, an aspect ratio is selected based on the source data. For example, if the source data is rectangular (e.g., the bounding box of the source data is twice as large as the width of the source data), then a rectangle with a 2-1 aspect ratio, between the width and the height of the rectangle, is selected. In addition to selecting an aspect ratio, the texture map technique determines a maximum resolution for a texture map. In one embodiment, the graphics system selects a resolution of 256 mega pixels as the highest resolution to generate image tiles.

In one embodiment, the texture map technique divides the data of the source image into tiles. For example, the texture map technique may select a tile size of 1K×1K pixels. For a tile size of 1K×1K pixels, if the maximum resolution of a texture map is 256 mega pixels, then the technique divide the highest resolution image into a 16×16 array of 1K×1K tiles.

FIG. 1a illustrates one embodiment for the first two levels of image tiles maps. For this example, image tile data 110 is divided into an array of 16×16 tiles, with each tile having a resolution of 1K×1K pixels. Image tile data 110 is the first level in a pyramid or hierarchy of image tiles. From image tile data 110, the graphics system generates a second level of image tiles. FIG. 1a also shows one embodiment for a second level of image tiles. For this example, image tile data 115 comprises an array of 8×8 tiles. The second level of the hierarchy of an image tile is generated by mapping multiple tiles of the highest level to a single tile in the current level.

For this embodiment, the texture map technique reduces the resolution between levels of the hierarchy of image tiles to ¼ of the previous level. Thus, four tiles from texture map 110 are mapped to a single tile in image tile 115. For the example tile size of 1K×1K, image tile 115 has a resolution of 64 mega pixels. FIG. 1A diagrammatically depicts the mapping between tiles of image tile data 110 and tiles of image tile data 115.

Figure 1B:
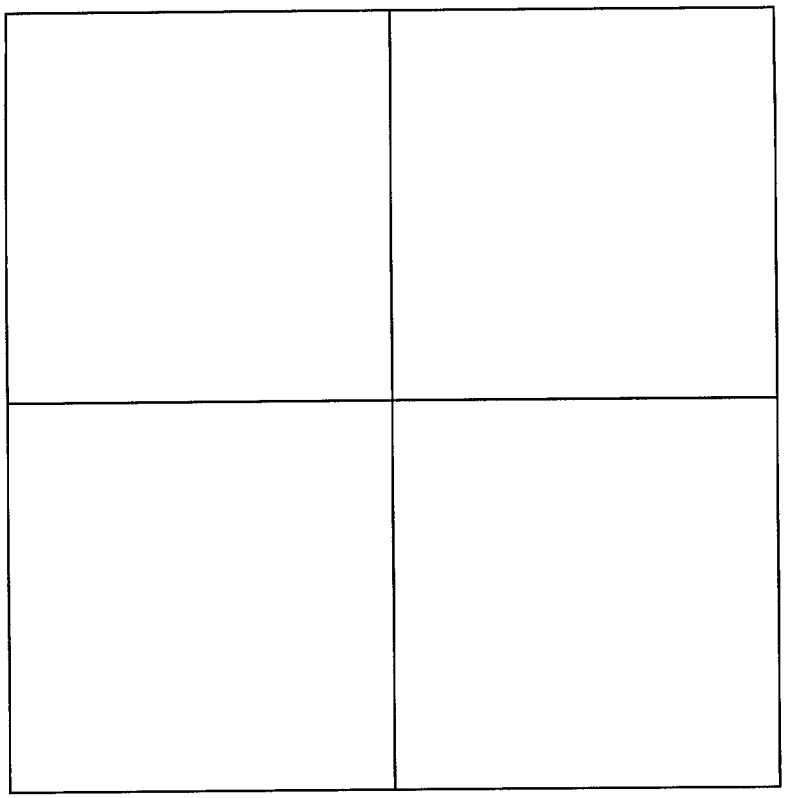
FIG. 1b illustrates one embodiment for a third and fourth levels of a hierarchy of texture maps.
Figure 1B:
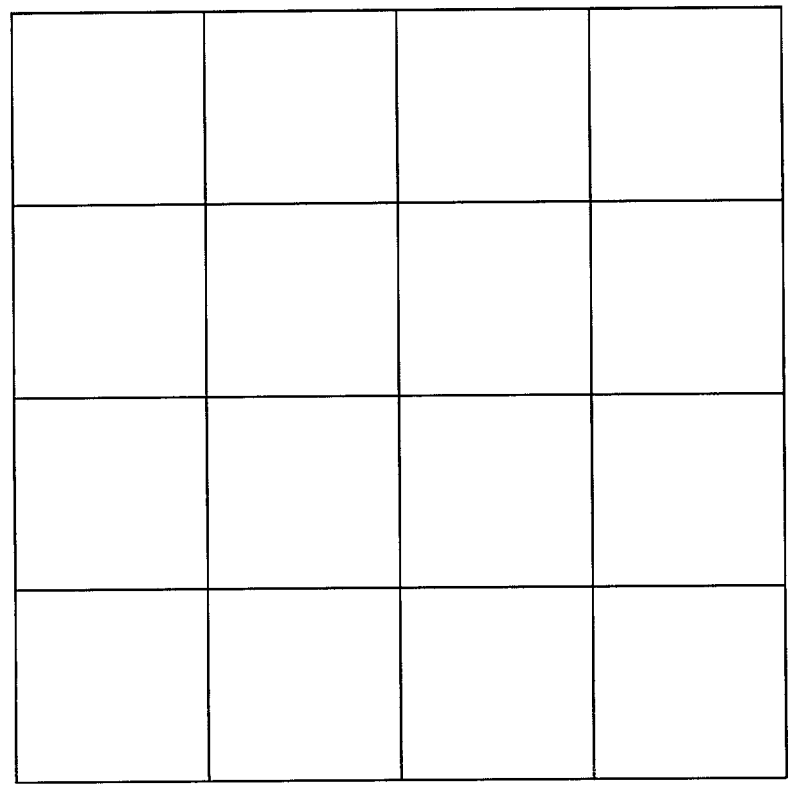

FIG. 1b illustrates one embodiment for third and fourth levels of a hierarchy of texture maps. The third level of image tile data, 120, includes a 4×4 array of tiles. The 120 image tile data is generated by mapping (4×4) tiles from image tile data 110 to the 4×4 array of tiles in image tile data 120. Thus, for the example tile size of 1K×1K, texture map 120 includes a total resolution of 16 mega pixels. The fourth level image tile data (130), also shown in FIG. 1b, comprises a 2×2 array of tiles. Similar to the creation of levels two and three, the fourth level image tile data is created by mapping 8×8 tile regions in image tile data 110 to the 2×2 array of image tile data in 130.

Figure 1C:
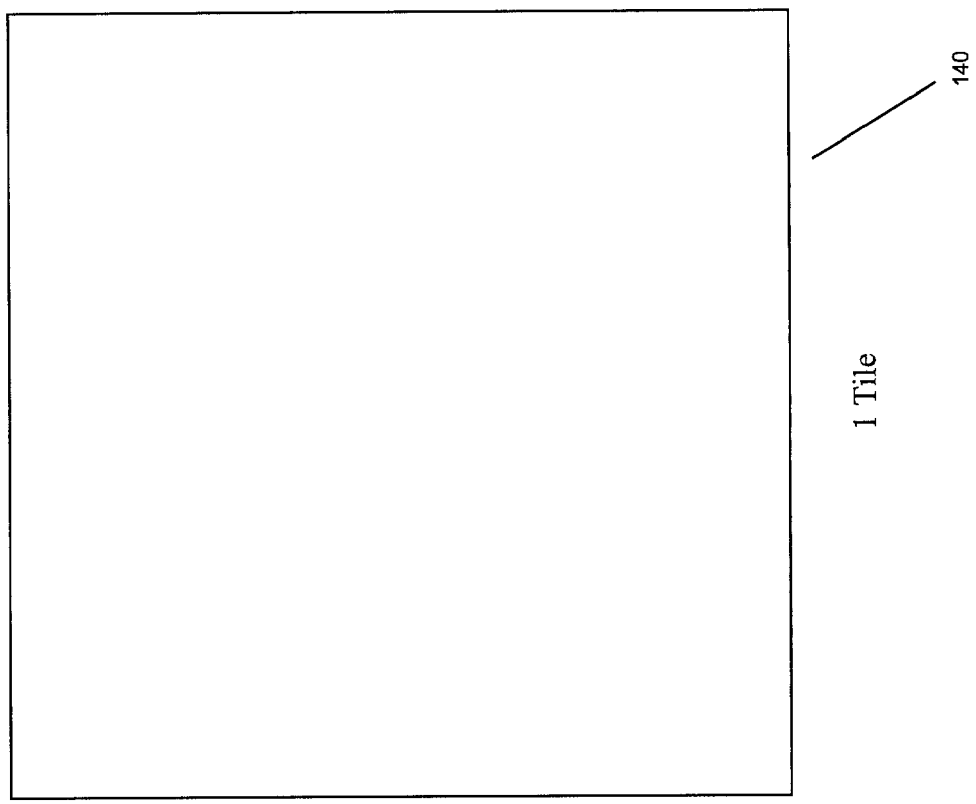
FIG. 1c illustrates one embodiment for a fifth level of a hierarchy of texture maps.

FIG. 1c illustrates one embodiment for a fifth level of a hierarchy of texture maps. The 140 map is generated by mapping the entire 16×16 tile region of image tile (110) to one tile in image tile (140). Thus, for the example that employs a tile size of 1K×1K, the total resolution for image tile data 140 is one (1) mega pixel. For the examples shown in FIGS. 1a, 1b and 1c, a pyramid of image tiles includes five levels, ranging from a resolution of 256 mega pixels to a resolution of 1 mega pixel.

Figure 2A:
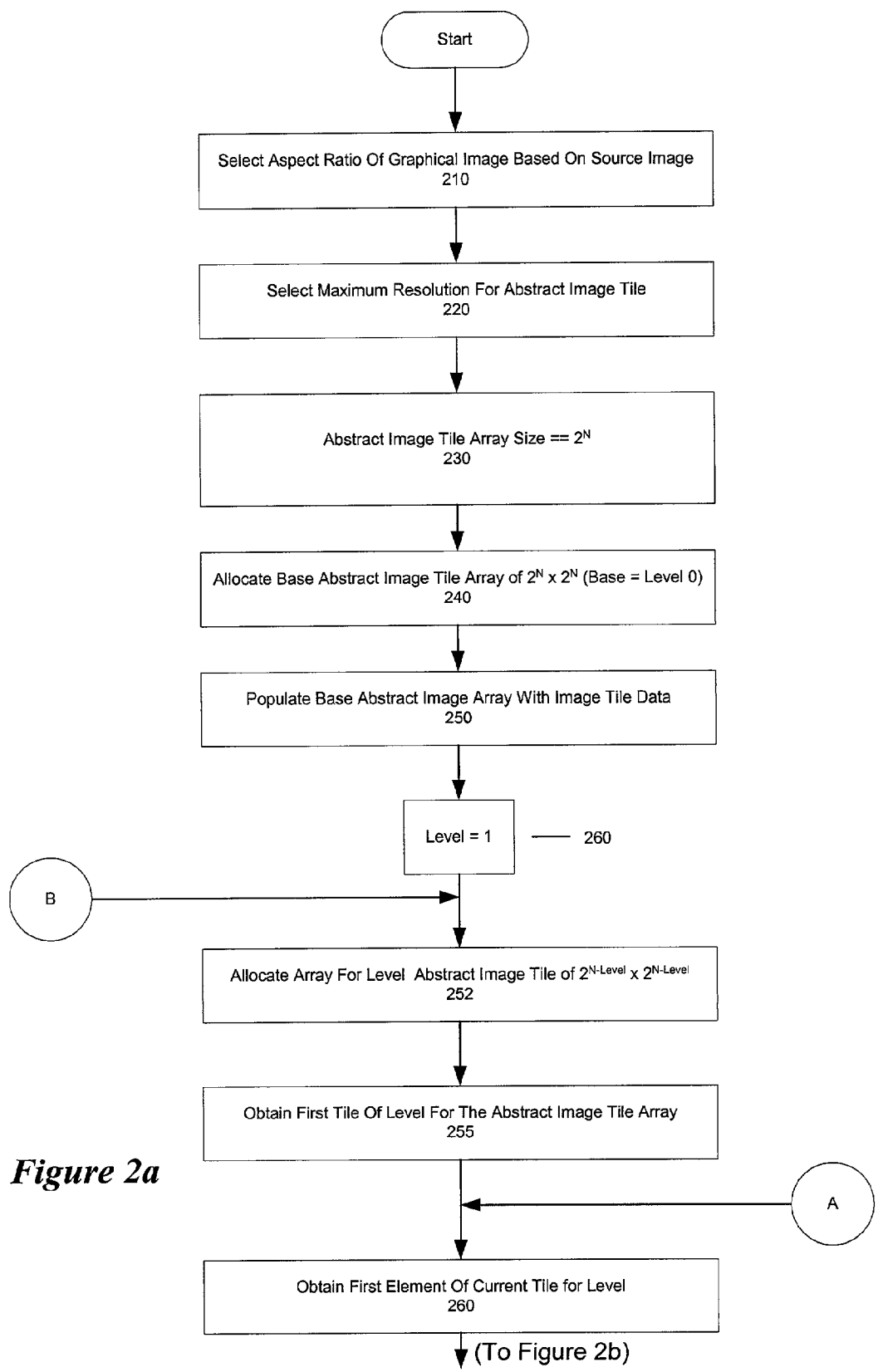
FIGS. 2a and 2b are flow diagrams illustrating one embodiment for generating a pyramid of texture maps.
Figure 2B:
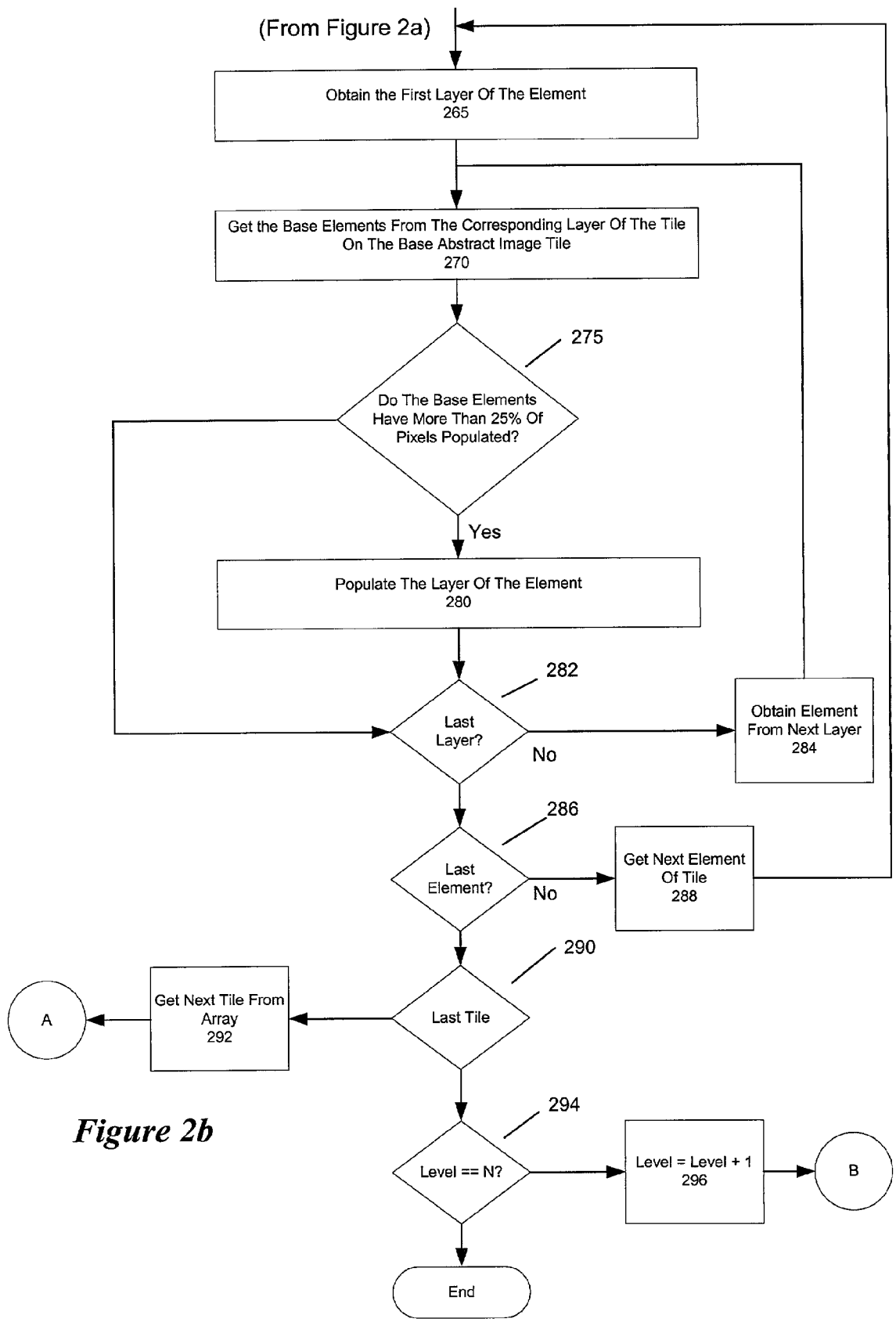

FIGS. 2a and 2b are flow diagrams illustrating one embodiment for generating a pyramid of image tile data. Based on the source image, an aspect ratio for the image tile data is selected (block 210, FIG. 2a). For example, if the source image comprises an integrated circuit design, then the aspect ratio for the image tile data is selected based on the aspect ratio of the integrated circuit design. A maximum resolution for the image tile data is selected (block 220, FIG. 2a). As discussed above, to render an image greater than the maximum resolution for the image tile data, the data structure technique is used. Based on the maximum resolution for the image tile data, a first level of image tile data is generated with a predetermined number of tiles. Then, an array of tiles with an image resolution of ¼ of the previous level is specified.

An abstract image tile array size is set (block 230, FIG. 2a). For purposes of nomenclature, the abstract image tile array size is set to $2^N$, wherein N represents an integer value. The base abstract image tile array is allocated with the element dimensions of $2^N \times 2^N$ (i.e., the base level is equal to level 0) (block 240, FIG. 2a). The base abstract image array is populated with image tile data (block 250, FIG. 2a).

The level of the abstract image tile array is set to 1 (block 260, FIG. 2a). An array for the abstract image tile level comprising the size of ($2^{N-Level} \times 2^{N-Level}$) is allocated (block 252, FIG. 2a). The first tile of the current level is obtained (block 255, FIG. 2a). Also, the first elements of the current tile are obtained (block 260, FIG. 2a). Then, the first layer of the element for the current tile is obtained (block 265, FIG. 2b).

In order to determine whether to populate the element on the current level, the corresponding elements of the base abstract image tile array are obtained. Specifically, the base elements from the corresponding layer of the tile on the base abstract image tile are obtained (block 270, FIG. 2b). If the base elements have more than 25 percent of the pixels populated, then the element on the current layer is populated (blocks 280 and 275, FIG. 2b). Alternatively, if the base elements do not have more than 25 percent of the pixels populated, then the element on the current layer is not populated (block 275, FIG. 2*b*).

The process then determines whether there are more layers to populate (block 282, FIG. 2*b*). If so, the element for the next layer is obtained, and the process repeats the loop consisting of blocks 270, 275, 280, and 282 with the element of the next layer (284). If there are no more layers to process, then the process determines whether there are any more elements to process for the current tile (block 286, FIG. 2*b*). If the last element has not been processed, then the next element for the current title is obtained (block 288, FIG. 2*b*), and the process repeats the loop consisting of blocks 265, 270, 275, 280, 282, and 284.

The process then determines whether the last tile for the current level has been processed (block 290, FIG. 2*b*). If the last tile in the current level has not been processed, then the next tile from the array is obtained (block 292, FIG. 2*b*), and blocks 260, 265, 270, 275, 280, 282, 284, 286, 288, 290, and 292 are repeated. The process then determines whether the last level has been processed (block 294, FIG. 2*b*). If the last level has not been processed, the level is incremented (i.e., Level=Level+1) (296) and steps within the loop to process a level are repeated (i.e., blocks 252, 255, 260, 265, 270, 275, 280, 282, 284, 286, 288, 290, 292, 294, and 296).

Figure 3:
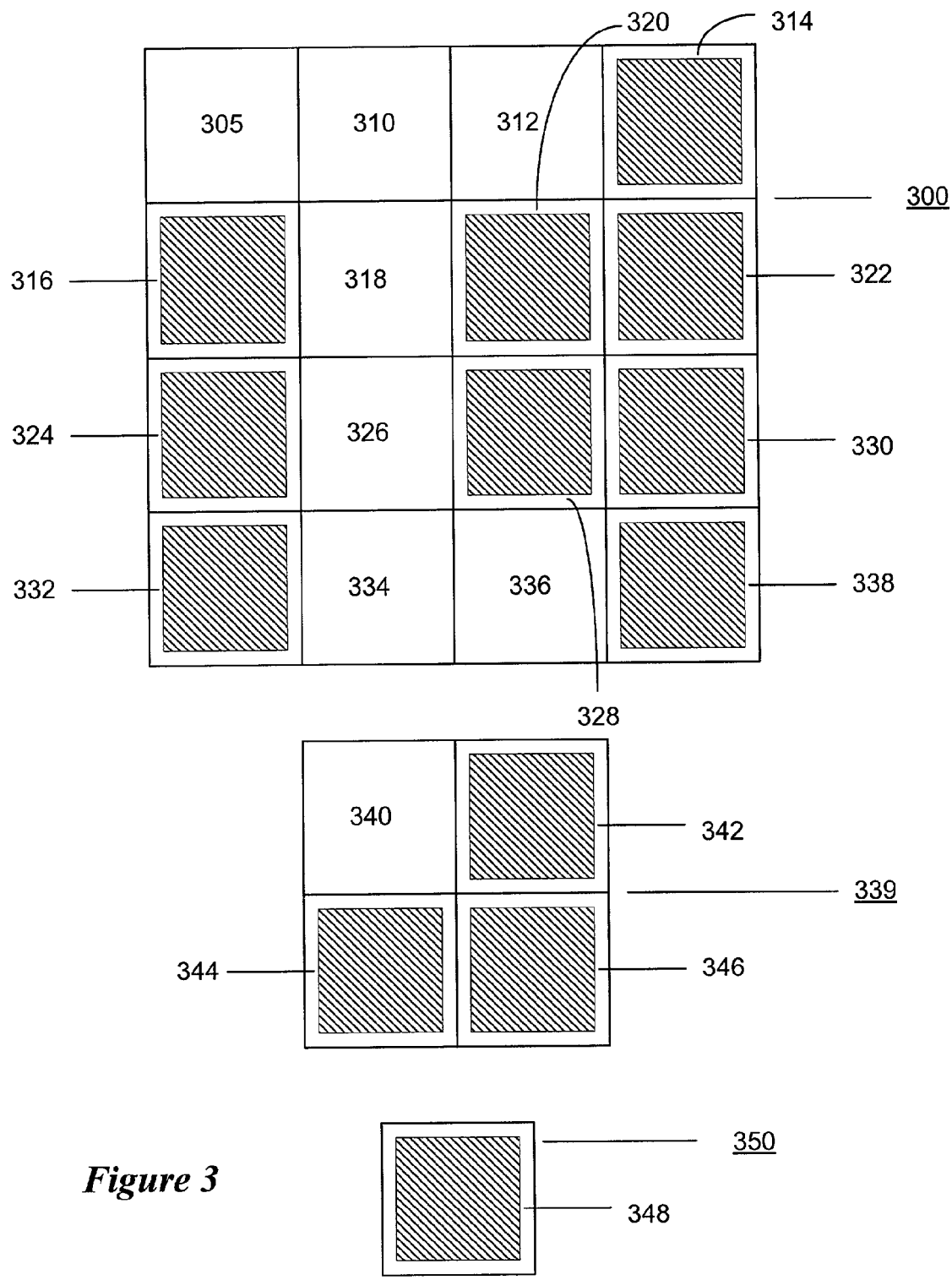
FIG. 3 illustrates one embodiment for mapping pixels from a previous texture map level to a current texture map level.

As discussed above, the texture map technique uses pixel density to determine whether to populate a pixel in a current image tile level based on pixels from the base abstract image tile level (i.e., level 0). FIG. 3 illustrates one embodiment for mapping pixels from a previous image tile level to a current image tile level. A first image tile 300 comprises a 4×4 array of pixels or elements. For this example, image tile 300 includes "on" pixels (314, 316, 320, 322, 324, 328, 330, 332 and 338) and "off" pixels (305, 310, 312, 318, 326, 334, and 336). A second image tile 339 includes a 2×2 array of pixels as shown in FIG. 3. To generate image tile 339, the texture map technique maps groups of pixels from the previous image tile (e.g., image tile 300) to a pixel in image tile 339. For this example, the texture map technique maps pixels 312, 314, 320, and 322 from image tile 300 to pixel 342 of image tile 339. For this grouping, pixels 314, 320, 322 are set in the "on" state, and thus this grouping has a pixel density of 75 percent. If the texture map technique uses a pixel density threshold of greater than 25 percent, then the technique populates pixel 342 with an "on" pixel (i.e., the pixel density of pixels 312, 314, 320 and 322 are greater than 25 percent). The pixel 340 of image tile 339 is generated based on the grouping 305, 310, 316 and 318 of image tile 300. This grouping (305, 310, 316 and 318) has a pixel density of 25 percent (pixel 316 is "on" while pixels 305, 310, and 318 are "off"). Since the pixel density of this grouping is not greater than 25 percent, pixel 340 is populated with an "off" state pixel. Similarly, pixel 344 of image tile 339 is generated based on the pixel grouping (324, 326, 332 and 334) of image tile 300, and pixel 346 of texture map 339 is based on the grouping of pixels 328, 330, 336 and 338 from image tile 300.

FIG. 3 also illustrates an example of a third level of texture maps. For this example, the third level image tile 350 includes only a single pixel, 348. The state of pixel 348 is based on the states of all of the 300 pixels. Since more then 25 percent of the pixels in image tile data 300 are set in the "on" state (i.e., approximately 56.25 percent of the pixels are set in the "on" state), pixel 348 is set to the "on" state.

Figure 4:
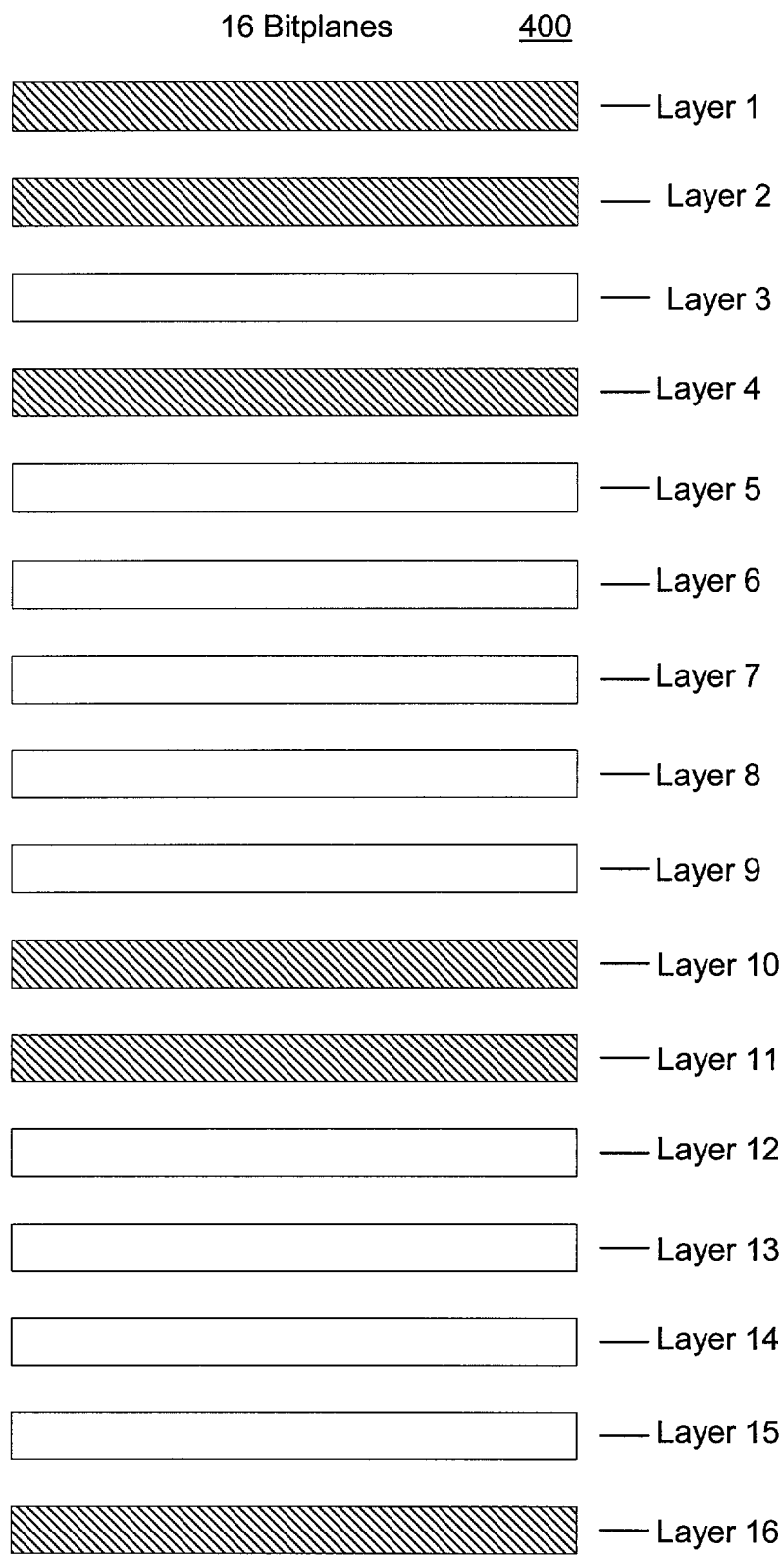
FIG. 4 illustrates an example bit plane for a single pixel of image data.

The graphics system of the present invention supports multi-level or multi-dimensional data. For this embodiment, a computer stores image data for a plurality of levels. In one embodiment, the levels represent layers of an integrated circuit design (i.e., layers of a semiconductor device). However, the graphics technique has applications for any type of multi-dimensional graphics data. The image data includes a bitplane. Each pixel of the image data has a corresponding bitplane. The bitplane stores values to represent multiple layers of the image data. FIG. 4 illustrates an example bit plane for a single pixel of image data. For this example, the bit plane stores data to represent 16 layers. Although the example bit plane of FIG. 4 stores data to support 16 layers, a bit plane may store any number of layers without deviating from the spirit or scope of the invention. The value of a bitplane is either a "one" or "zero" to represent an "on" pixel or an "off" pixel, respectively. Thus, for this example, bit plane 400 indicates, for a corresponding pixel, an "on" state for layers 1, 2, 4, 10, 11 and 16. Conversely, bit plane 400 stores an "off" state for layers 3, 5, 6, 7, 8, 9, 12, 13, 14 and 15.

Figure 5:
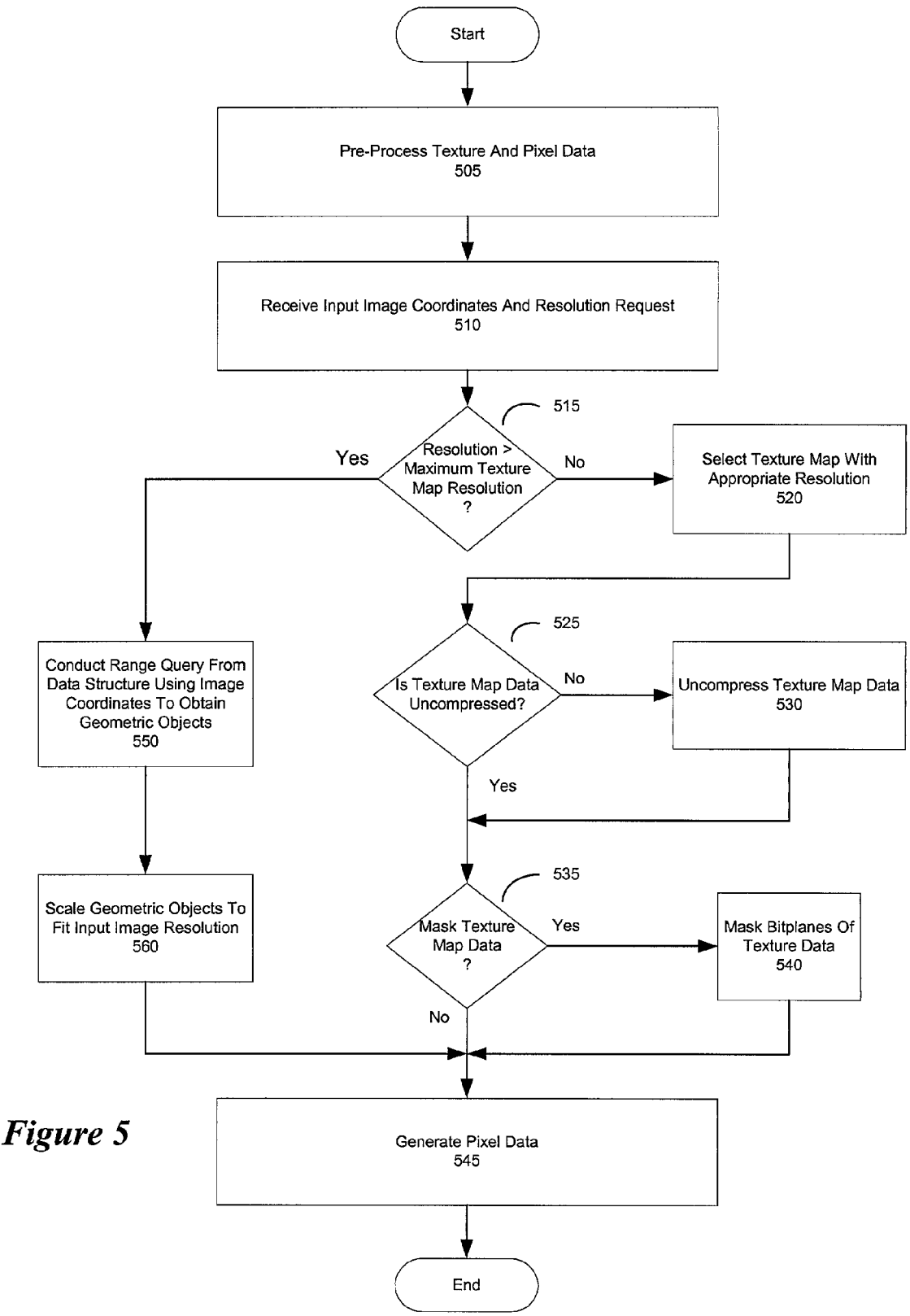
FIG. 5 is a flow diagram illustrating one embodiment for operation of the graphics system at runtime.

FIG. 5 is a flow diagram illustrating one embodiment for operation of the graphics system at runtime. For a given source image, the graphics system generates a pyramid of image tile data. In one embodiment, the graphics system pre-processes the image tile data (block 505, FIG. 5). First, the graphics system compresses all the image tiles, and stores the compressed image tiles in computer system memory. In one embodiment, the graphics system employs a compression technique to obtain a 20 to 1 compression ratio. Also, the graphics system uncompresses a portion of the image tiles, and stores the uncompressed image data in computer system memory. For example, the graphics system may uncompress 40 1K×1K tiles.

Furthermore, the graphics system generates texture maps for a portion of the uncompressed image data. As is well-known, texture maps are generated from image data by applying multi-spectral information to the image tile data. In one embodiment, conversion of image tile data to texture maps is accomplished through color lookup tables. The graphics system may generate texture maps for 25 image tiles. The texture maps are generally stored in the onboard graphics memory of the graphics hardware of the computer.

The graphics system pre-processes data prior to requests by a user. To accomplish this, the graphics system pre-processes tiles at the lowest resolution in anticipation that the user will first view the source image at the lowest resolution. As the user selects greater resolution to view the source image, the graphics system processes additional tiles to anticipate the user's request. For example, the user may view the center portion of the source image at a first resolution. Based on this request, the graphics system processes image data for the center portion of the source image at the next greater resolution. For example, the graphics system may process tiles that constitute the center portion of the source image, as well as tiles that surround the center portion. For this embodiment, the processing includes obtaining the compressed image tile data from memory, uncompressing the image tile data, and generating texture maps from the uncompressed image data. Similarly, if the user generates a request to pan image data, then the graphics system preprocesses additional data (surrounding tiles) around the new portion of the source image requested by the user. As such, the graphics system attempts to preprocess so as to enhance the overall performance of the graphics system. In the event that a particular piece of data is not readily available, then the system moves up the texture hierarchy searching for a lower resolution substitute that satisfies the request.

Returning to the flow diagram of FIG. 5, the graphics system receives input image coordinates and resolution requests from a user (block 510, FIG. 5). The requests may come from an underlying application program. For example, the graphics system may support an underlying EDA application, and the user may generate requests to view an integrated circuit design. If the resolution of the user request is greater than the maximum resolution of a texture map, then the graphics system uses the data structure technique (block 515, FIG. 5). Specifically, using the data structure technique, the graphics system conducts a range query, using the data structures and the input image coordinates, to obtain geometric objects (blocks 550, FIG. 5). Then, the graphics system scales the geometric objects to fit the input resolution of the request (block 560, FIG. 5). Alternatively, if the resolution of the input request is not greater than the maximum image tile data resolution, then the graphics system uses the texture map technique.

Using the texture map technique, the graphics system selects the image tile that has the appropriate resolution for the input request (block 520, FIG. 5). If the image tile data is compressed, then the graphics system uncompresses this image tile data (blocks 525 and 530, FIG. 5).

The image tiles also provide a means for masking the content used in the conversion to texture map data. In one embodiment, the image tile data is masked with data by performing a logical AND operation. This technique provides a means for viewing selected content without the need to generate new image tiles. For the EDA application, this technique is used to turn off the layers displayed in an integrated circuit design. For example, the viewer of the integrated circuit design may desire to mask the view of layer 3. For this example, the graphics software masks the content of each layer 3 element within the image tile so as to eliminate layer 3. For example, image tile data may designate content for layer 3 as the most important layer and content for layer 2 as the next most important layer. If the graphics software masks the content for layer 3, then the content of layer 2 is displayed. This technique for masking content of the image tile data may be applied to any type of information stored as image tile element data. For example, the image tile data may store information regarding power consumption for an integrated circuit design. The display of the information content may be turned on and off by this masking technique.

The graphics system provides the ability to turn on and off layers of the multilevel or multidimensional image tile data. In one embodiment, a mask is used to turn on and off layers of the multidimensional image tile data. Specifically, the mask is generated based on input from a user. For example, the underlying application program may provide a user a means to activate (turn on) certain layers of the multi dimensional image data. Also, the underlying application program may provide a means for a user to deactivate (turn off) certain layers of the multi dimensional image data. For the EDA application, the user may desire to turn off one or more layers of an integrated circuit design to view the design with only the layers of interest.

Returning to the flow diagram of FIG. 5, if the image tile data is uncompressed, (or after the graphics system uncompresses the image tile data), then a mask to alter the multi-level data is applied. If the user desires to turn on or off layers of the multi-dimensional image tile data, then the bit plane's of the image tile data are masked (block 540, FIG. 5). Then, texture map data is generated from the masked image tile data (block 545, FIG. 5).

During run time, the graphics application converts image tile data, which represents content of the source image, to RGB texture map data. In one embodiment for the EDA application, the graphics software uses a look-up table to convert content associated with an interconnect layer of an IC design to a unique color. For example, if the pixel data specifies that layer 4 is the most important display data, then the graphics software looks-up the color for layer 4 to generate the RGB color data for the corresponding pixel.

Figure 6:
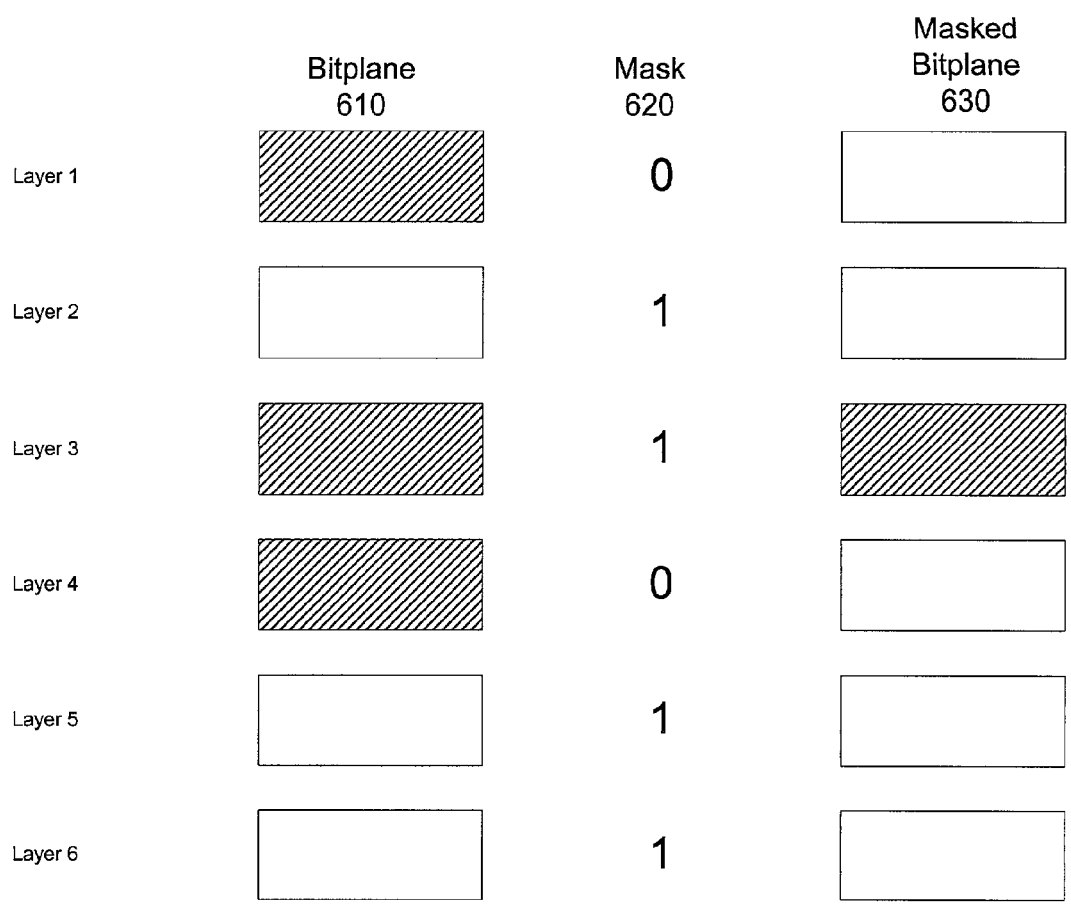
FIG. 6 illustrates masking a bit plane for image data to generate a masked bit plane.

FIG. 6 illustrates masking a bit plane for image tile data to generate a masked bit plane. An example bit plane for a single pixel in a texture map (610) is shown. For the example of FIG. 6, the bit plane supports six layers. For this example, the state of the corresponding image tile element is "on" for layers 1, 3 and 4, and the state for layers 2, 5 and 6, are "off." A mask is generated for application to the bit plane. The mask may be generated through any number of means. A user interface on the underlying application program may permit the user to selectively turn off one or more layers of the source image. For the example of FIG. 6, mask 620 turns off, or deactivates, layers 1 and 4 of the image data. For the example of FIG. 6, a masked bit plane 630 shows the results of masking bit plane 610 with masked 620. Specifically, the state of layer 1 of bit plane 610 is "on", and is subsequently turned "off" from application of mask 620. Similarly, the pixel value corresponding to layer four is converted from an "on" state to an "off" state from application of masked 620.

Figure 7:
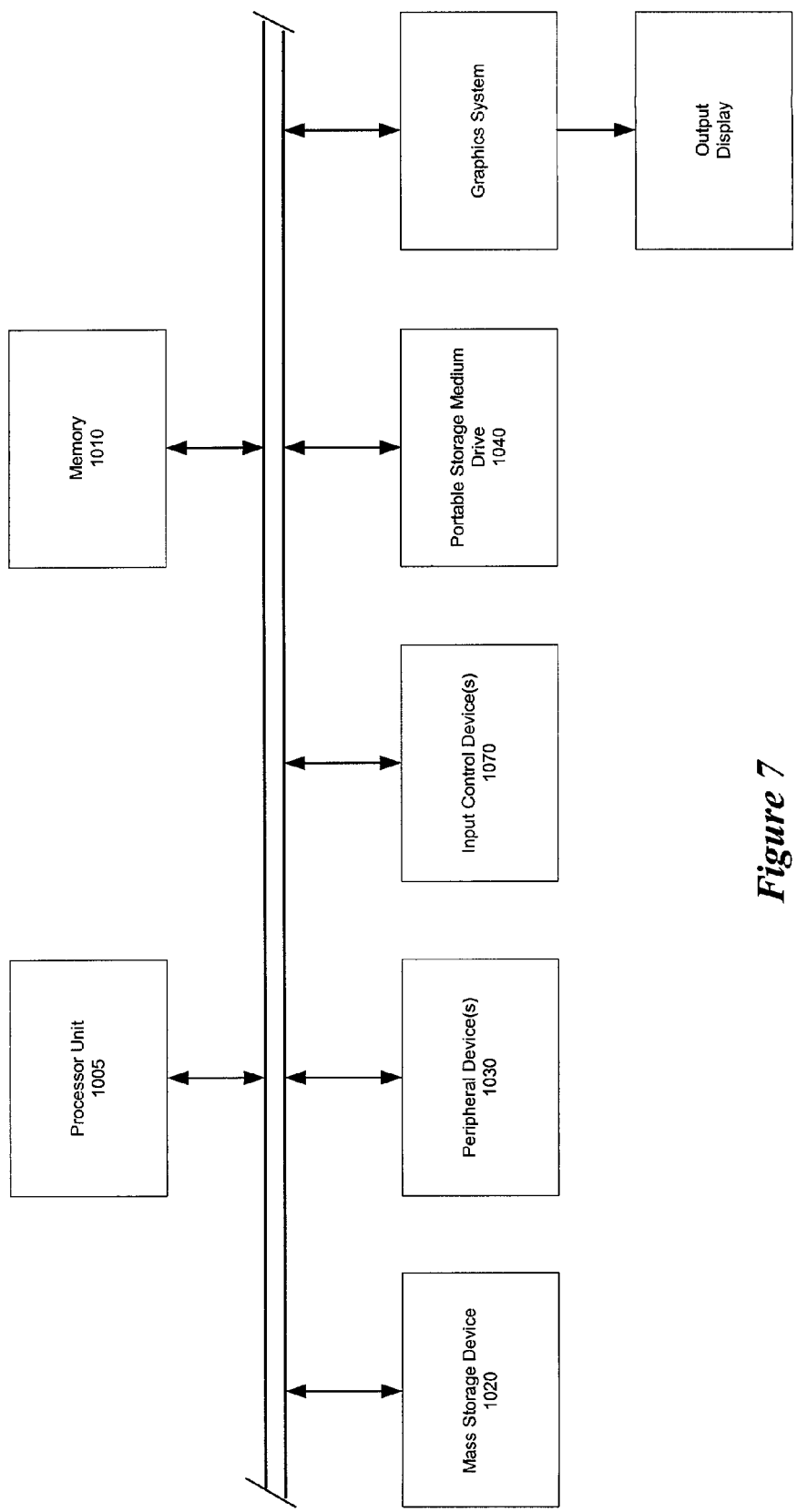
FIG. 7 illustrates a high-level block diagram of a general-purpose computer system for operating the graphics application.

Computer System:

FIG. 7 illustrates a high-level block diagram of a general purpose computer system for processing the graphics applications. A computer system 1000 contains a processor unit 1005, main memory 1010, and an interconnect bus 1025. The processor unit 1005 may contain a single microprocessor, or may contain a plurality of microprocessors for configuring the computer system 1000 as a multi-processor system. The main memory 1010 stores, in part, instructions and data for execution by the processor unit 1005. If the graphics system of the present invention is partially implemented in software, the main memory 1010 stores the executable code when in operation. The main memory 1010 may include banks of dynamic random access memory (DRAM) as well as high speed cache memory.

The computer system 1000 further includes a mass storage device 1020, peripheral device(s) 1030, portable storage medium drive(s) 1040, input control device(s) 1070, a graphics system 1050, and an output display 1060. For purposes of simplicity, all components in the computer system 1000 are shown in FIG. 7 as being connected via the bus 1025. However, the computer system 1000 may be connected through one or more data transport means. For example, the processor unit 1005 and the main memory 1010 may be connected via a local microprocessor bus, and the mass storage device 1020, peripheral device(s) 1030, portable storage medium drive(s) 1040, graphics system 1050 may be connected via one or more input/output (I/O) busses. The mass storage device 1020, which may be implemented with a magnetic disk drive or an optical disk drive, is a non-volatile storage device for storing data and instructions for use by the processor unit 1005. In the software embodiment, the mass storage device 1020 stores the graphics system software for loading to the main memory 1010.

The portable storage medium drive 1040 operates in conjunction with a portable non-volatile storage medium, such as a floppy disk or a compact disc read only memory (CD-ROM), to input and output data and code to and from the computer system 1000. In one embodiment, the graphics system software is stored on such a portable medium, and is input to the computer system 1000 via the portable storage medium drive 1040. The peripheral device(s) 1030 may include any type of computer support device, such as an input/output (I/O) interface, to add additional functionality to the computer system 1000. For example, the peripheral device(s) 1030 may include a network interface card for interfacing the computer system 1000 to a network.

The input control device(s) 1070 provide a portion of the user interface for a user of the computer system 1000. The input control device(s) 1070 may include an alphanumeric keypad for inputting alphanumeric and other key information, a cursor control device, such as a mouse, a trackball, stylus, or cursor direction keys. In order to display textual and graphical information, the computer system 1000 contains the graphics system 1050 and the output display 1060. The output display 1060 may include a cathode ray tube (CRT) display or liquid crystal display (LCD). The graphics system 1050 receives textual and graphical information, and processes the information for output to the output display 1060. The components contained in the computer system 1000 are those typically found in general purpose computer systems, and in fact, these components are intended to represent a broad category of such computer components that are well known in the art.

The graphics system may be implemented in either hardware or software. For the software implementation, the graphics system is software that includes a plurality of computer executable instructions for implementation on a general-purpose computer system. Prior to loading into a general-purpose computer system, the graphics system software may reside as encoded information on a computer readable medium, such as a magnetic floppy disk, magnetic tape, and compact disc read only memory (CD-ROM). In one hardware implementation, the graphics system may comprise a dedicated processor including processor instructions for performing the functions described herein. Circuits may also be developed to perform the functions described herein.

Although the present invention has been described in terms of specific exemplary embodiments, it will be appreciated that various modifications and alterations might be made by those skilled in the art without departing from the spirit and scope of the invention.

What is claimed is:

1. A method for generating a plurality of abstract image tiles to represent a source image for an integrated circuit (IC) layout, said method comprising the steps of:
   generating a first level of abstract image tiles within the IC layout, said first level of abstract image tiles having a first grouping of elements, each element having an "on" state or an "off" state to represent the source image with a first resolution;
   generating a plurality of additional levels of abstract image tiles within the IC layout, based on said first level of abstract image tiles, wherein each particular level of additional abstract image tiles has a particular grouping of elements to represent the source image with a particular resolution, wherein each particular grouping of elements has at least an element, wherein for an integer n greater than 1, generating each of plurality of n additional levels of abstract image tiles includes the steps of:
   directly generating a plurality of mappings between said first grouping of elements from said first level of abstract image tiles to said particular grouping of elements from said level n of abstract image tiles;
   generating for an element in said particular grouping an "on" element if said first grouping of elements mapped from said first level of abstract image tiles comprises a threshold density of "on" elements; and
   generating for an element in said particular grouping an "off" element if said first grouping of elements mapped from said first level of abstract image tiles does not comprise a threshold density of "on" elements.

2. The method as set forth in claim 1, wherein said threshold density comprises a subset of elements greater than twenty five percent of elements in a first grouping.

3. The method as set forth in claim 1, wherein said first grouping comprises four elements for each element in a second grouping.

4. The method as set forth in claim 1, wherein:
   said source image comprises multiple layers; and
   said first level of abstract image tiles and each of said additional level of abstract image tiles comprise a bit plane comprising a plurality of layers for each of said levels in said source image.

5. The method as set forth in claim 1 further comprising the steps of:
   dividing said first level of abstract image tiles into a plurality of tiles, wherein each tile comprises a predetermined resolution; and
   mapping a plurality of tiles from said first level of abstract image tiles to a single tile in a level n abstract image tiles.

6. A method of generating a hierarchical multi-level pyramid of abstract image tiles for an integrated circuit (IC) layout, said method comprising the steps of:
   dividing an IC layout abstract image tiles of level 0 into level 0 groupings such that each of said level 0 groupings comprises a plurality of elements, each element having an "on" state or an "off" state to represent a source image with a first resolution;
   dividing an IC layout abstract image tiles of level n into level n groupings such that each of said level n groupings comprises at least one element, wherein n comprises any integer value greater than 1;
   directly generating a plurality of mappings between said level 0 groupings of elements from said level 0 abstract image tiles to said level n groupings of at least one element from said level n abstract image tiles;
   generating for an element in said level n groupings an "on" element if said level 0 groupings of elements mapped from said level 0 abstract image tiles comprise a threshold density of "on" elements; and
   generating for a element in said level n groupings an "off" element if said level 0 groupings of elements mapped from said level 0 abstract image tiles does not comprise a threshold density of "on" elements.

7. A computer readable medium storing a plurality of instructions, which when executed by a computer, causes the computer to perform the steps of:
   generating a first level of abstract image tiles within an integrated circuit (IC) layout, said first level of abstract image tiles having a first grouping of elements, each element having an "on" state or an "off" state to represent a source image with a first resolution;
   generating a plurality of additional levels of abstract image tiles within the IC layout, based on said first level of abstract image tiles, wherein each particular level of additional abstract image tiles has a particular grouping of elements to represent the source image with a particular resolution, wherein each particular grouping of elements has at least an element, wherein for an integer n greater than 1, generating each of plurality of n additional levels of abstract image tiles includes the steps of:
- directly generating a plurality of mappings between said first grouping of elements from said first level of abstract image tiles to said particular groupings of elements from said level n of abstract image tiles;
- generating for an element in said particular grouping an "on" element if said first grouping of elements mapped from said first level of abstract image tiles comprise a threshold density of "on" elements; and
- generating for an element in said particular grouping an "off" element if said first grouping of elements mapped from said first level of abstract image tiles does not comprise a threshold density of "on" elements.

8. The computer readable medium as set forth in claim 7, wherein said threshold density comprises a subset of elements greater than twenty five percent of elements in a first grouping.

9. The computer readable medium as set forth in claim 7, wherein said first grouping comprises four elements for each element in a second grouping.

10. The computer readable medium as set forth in claim 7, wherein:
- said source image comprises multiple layers; and
- said first level of abstract image tiles and each of said additional level of abstract image tiles comprise a bit plane comprising a plurality of layers for each of said levels in said source image.

11. The computer readable medium as set forth in claim 7, further storing a plurality of instructions, which when executed by a computer, causes the computer to perform the steps of:
- dividing said first level of abstract image tiles into a plurality of tiles, wherein each tile comprises a predetermined resolution; and
- mapping a plurality of tiles from said first level of abstract image tiles to a single tile in a level n abstract image tiles.

12. A computer readable medium storing a plurality of instructions, which when executed by a computer, causes the computer to generate a hierarchical pyramid of abstract image tiles for an IC layout by executing the steps of:
- dividing an IC layout abstract image tiles of level 0 into level 0 groupings such that each of said level 0 groupings comprises a plurality of elements, each element having an "on" state or an "off" state to represent a source image with s first resolution;
- dividing an IC layout abstract image tiles of level n into level n groupings such that each of said level n groupings comprises at least one element, wherein n comprises any integer value greater than 1;
- generating a plurality of mappings between said level 0 groupings of elements from said level 0 abstract image tiles to said level n groupings of at least one element from said level n abstract image tiles;
- directly generating for an element in said level n groupings an "on" element if said level 0 groupings of elements mapped from said level 0 abstract image tiles comprise a threshold density of "on" elements; and
- generating for a element in said level n groupings an "off" element if said level 0 groupings of elements mapped from said level 0 abstract image tiles does not comprise a threshold density of "on" elements.

13. A computer graphics system for an IC layout comprising:
- a memory for storing a first level of abstract image tiles within an integrated circuit (IC) layout, said first level of abstract images having a first grouping of elements, each element having "on" and "off" states to represent a source image with a first resolution, and for storing a a plurality of additional levels of abstract image tiles within the IC layout, based on said first level of abstract image tiles, wherein each level n of additional abstract image tiles has a particular grouping of elements to represent the source image with a particular resolution, wherein n is an integer greater than 1, wherein each particular grouping of elements has at least an element; and
- a processor unit, coupled to said memory, for generating directly a plurality of mappings between said first grouping of elements from said first level of abstract image tiles to said particular grouping of elements from said level n of abstract image tiles, generating for an element in said particular grouping an "on" element if said first grouping of elements mapped from said first level of abstract image tiles comprise a threshold density of "on" elements, and generating for an element in said particular grouping an "off" element if said first grouping of elements mapped from said first level of abstract image tiles does not comprise a threshold density of "on" elements.

* * * * *